United States Patent
Hunter

[11] 3,827,459
[45] Aug. 6, 1974

[54] WATER POWERED DRIVE FOR AUTOMATIC CONTROLLERS

[75] Inventor: Edwin J. Hunter, Riverside, Calif.

[73] Assignee: The Toro Company, Riverside, Calif.

[22] Filed: Oct. 19, 1971

[21] Appl. No.: 190,528

[52] U.S. Cl............... 137/624.14, 91/218, 91/364, 137/624.2, 239/70
[51] Int. Cl............................................. A01g 27/00
[58] Field of Search........ 74/126, 142; 91/218, 364, 91/366, 419, 435; 137/624.14, 624.18, 624.2; 239/66, 70

[56] References Cited
UNITED STATES PATENTS

| | | | |
|---|---|---|---|
| 2,096,458 | 10/1937 | Johnson | 74/126 UX |
| 2,613,750 | 10/1952 | Brequet et al. | 91/450 X |
| 3,042,074 | 7/1962 | Graybill | 137/624.14 X |
| 3,336,945 | 8/1967 | Bostock et al. | 137/624.14 |
| 3,345,915 | 10/1967 | Dotto | 91/419 X |
| 3,428,085 | 2/1969 | Haberstump | 137/624.2 |
| 3,444,896 | 5/1969 | Van Der Veer | 137/624.2 |
| 3,481,231 | 12/1969 | Cormier | 91/364 X |
| 3,496,834 | 2/1970 | Kice et al. | 91/218 |

Primary Examiner—Alan Cohan
Assistant Examiner—Gerald A. Michalsky

[57] ABSTRACT

An automatic irrigation controller apparatus having a cam follower operated bank of pilot valves for operating selected pilot operated water valves throughout a watering or irrigation system is provided with a water powered means for receiving water under pressure from a source thereof and a member driven in a predetermined manner by the force of such water for driving a cam means to operate said cam followers via power transmission means between the water driven member and a cam shaft mounting said cam. A water piston is mounted in a cylinder with associated water valve means for selectively connecting the cylinder to a source of water under pressure and to a vent to provide a reciprocal movement for the piston, a return stroke for the piston being accomplished through the provision of a spring. A reciprocal piston movement is translated through a power transmission means including a drive ratchet wheel connected to the piston and a driven ratchet wheel connected to the cam shaft. An escapement mechanism is provided with a ring gear mounted about an engagement with a plurality of planetary gears mounted by a carrier about a sun gear driven by an input shaft of the apparatus connected to the cam shaft. Differences in the speed of rotation of the input shaft and the escapement means ring gear cause movement of the carrier which is connected to a valve restricting means for restricting the flow of water to the cylinder to regulate the speed of the water motor and rotation of the apparatus input shaft to that determined by the escapement mechanism.

8 Claims, 18 Drawing Figures

PATENTED AUG 6 1974 3,827,459

INVENTOR.
EDWIN J. HUNTER
BY
Miketta, Glenny, Poms & Smith
ATTORNEYS.

INVENTOR.
EDWIN J. HUNTER

BY
Miketta, Glenny, Poms & Smith
ATTORNEYS.

INVENTOR.
EDWIN J. HUNTER
BY
Miketta, Glenny, Poms & Smith
ATTORNEYS.

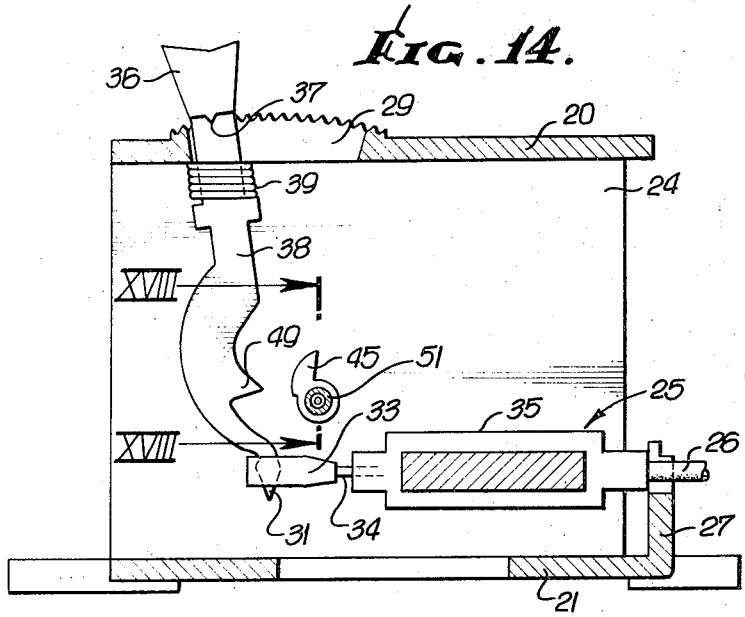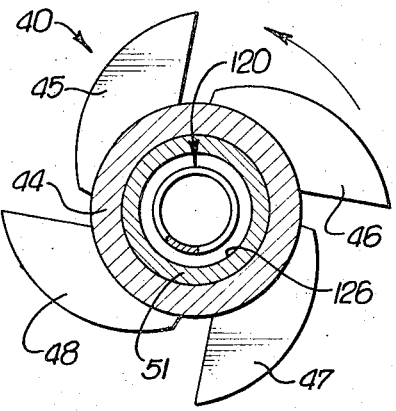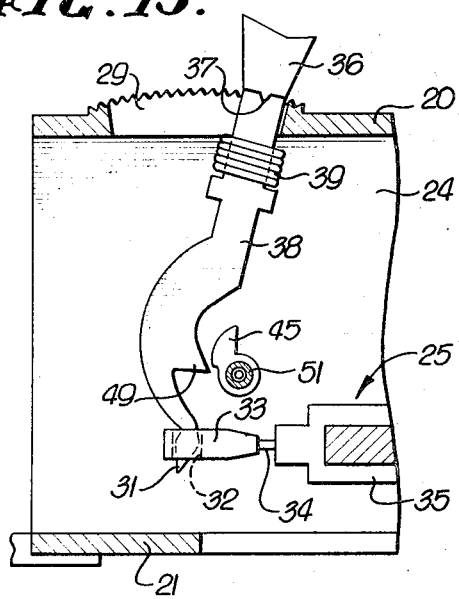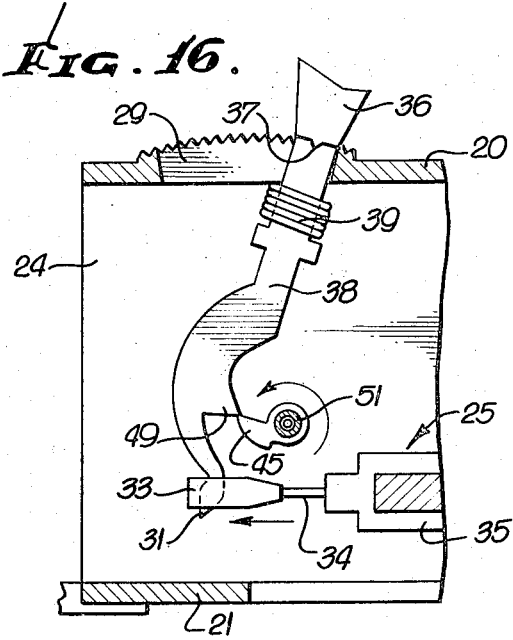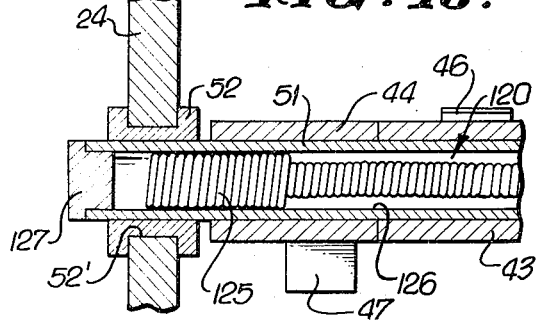

WATER POWERED DRIVE FOR AUTOMATIC CONTROLLERS

BACKGROUND OF THE INVENTION

This invention relates generally to controller apparatus used to produce a timed sequence of operations and more particularly to a drive mechanism therefor. Specifically, the present invention relates to a water powered drive means for operating an automatic controller apparatus, such as an irrigation control apparatus having a caming means mounted upon a caming shaft for engaging a plurality of control arms which in turn operate pilot valves associated with pilot operated water valves in an irrigation or watering system.

An automatic irrigation control apparatus is shown in United States Letters Patent No. 2,821,434 of which I am a co-inventor, the disclosure of said U.S. Pat. No. 2,821,434 being incorporated herein by its reference. Generally stated, however, the automatic irrigation control apparatus of the aforesaid patent includes a bank of pilot water valves operated by a series of control levers, caming means for operating the levers, an electric motor drive means, generally a constant speed clock-type motor, and transmission and clutch means for selectively connecting the caming means to the constantly running motor drive means. As a cam on the caming means interferes with an associated control lever of this prior control appatatus, the control apparatus opened an associated pilot valve to allow water flow to a pilot operated water valve in a selected area of an irrigation system to initiate a watering or sprinkling operation therein. A timing or watering cycle therefor continued during the constant speed driving of the cam past a cam follower portion provided in the control lever, the length of the watering or sprinkling operation being adjustable through movement of the control lever. However, in this prior controller, as in other similar controllers heretofore available, the constant speed, clock-type motor has comprised an electric motor requiring electrical connections and, of course, a source of electric power.

In many installations of automatic irrigation control devices, for example, the control device is preferably located where it is convenient to connect it to the water lines of the irrigation or sprinkling system. Such location is frequently remote from a source of electric power and special electrical provisions must be made for installation of the controller. Further, the use of an electric motor drive for a controller apparatus requires various safety precautions be taken in the overall construction and operation of the device in order to minimize hazards accompanying the use of electrical power in association with water handling equipment.

It is therefore the primary object of the present invention to disclose and provide a water powered drive means for an automatic control apparatus.

It is another object of the present invention to disclose and provide a drive means for an automatic irrigation control apparatus which is powered by the water pressure normally available for operating sprinkling and watering devices in the irrigation system being controlled.

It is a still further object of the present invention to disclose and provide a water powered drive means for an automatic controller apparatus which drives such apparatus at a constant speed, as a clock-type electric motor would, without the need for electrical connections or electrical power.

SUMMARY OF THE INVENTION

Generally stated, the present invention in drive means for operating an automatic controller apparatus includes the provision of water powered means for receiving water under pressure from a source thereof and which has a member driven in a predetermined manner by the force of the water pressure for driving the controller apparatus input or power shaft in response to movement of the member thorugh a power transmission means. The water powered means includes a cylinder for receiving water under pressure and the member preferably comprises a piston mounted for reciprocal movement within the cylinder. Spring means are provided for returning the piston to an initial position after each power stroke under action of the water pressure introduced into the cylinder.

Further, water valve means are provided in accordance with the present invention for selectively connecting the aforesaid water powered means to a source of water under opessure to alternately supply water to the cylinder and to vent the cylinder in order to relieve the water pressure therein. The valve means includes a valve reversing means for reversing the valve between such water supply and venting conditions and preferably, is provided with means for restricting the flow of water through the valve in order to regulate the speed of reciprocation of the piston within the cylinder. Speed control means are provided in association with an escapement mechanism for operating the aforesaid means for restricting water flow through the valve means in order to provide a constant speed timing drive for the controller apparatus through the water powered means.

A more complete understanding of the improvement in automatic control apparatus drive mechanism according to the present invention, as well as other objects and various advantages thereof, will become apparent to those skilled in the art from a consideration of the following detailed explanation of a preferred exemplary embodiment of the present invention. Reference will be made to the appended sheets of drawings in which:

BRIEF DESCRIPTION OF THE DRAWINGS

FIG. 14 is a sectional view of the exemplary embodiment of automatic irrigation control apparatus of FIG. 3 taken therein along the plane XIV—XIV, the pilot valve illustrated being in a closed position and the operating lever in a nonoperating position;

FIG. 15 is a sectional view of the apparatus of FIG. 14 showing the operating lever positioned in a timing or operating position preparatory to being operated by the caming means;

FIG. 16 is a sectional view of the apparatus of FIGS. 14 and 15 showing the caming means engagement with the operating lever and the associated pilot valve in an open position;

FIG. 17 is a detail view, partially in section, of a caming means of the apparatus of FIG. 3; taken therein along the plane XIV—XIV; and FIG. 18 is a detail view, partially in section, of a portion of a means for rapidly advancing the caming means between engagements with the operating levers, the partial sectional view of FIG. 18 being a continuation of the portion of said means for rapidly advancing shown in FIG. 10.

DESCRIPTION OF THE PREFERRED EMBODIMENT:

The Exemplary Automatic Controller

An exemplary embodiment of the present invention in water powered means for operating an automatic controller apparatus will now be explained in detail in association with an exemplary control apparatus, which in the present disclosure comprises an automatic irrigation control apparatus having a cam follower operated bank of pilot valves for operating selected pilot operated water valves throughout a watering or irrigation system. Before explaining the construction and operation of the water powered means of the present invention, the overall operation and construction of the exemplary automatic control apparatus will be made. However, initially, it should be noted that the water powered drive means is indicated generally at 70 in FIGS. 2, 3, 4, and 6. A governor or speed control means 71 is associated with the water motor means, indicated generally at 72, with a motor output shaft 73 connected to the controller associated pinion gear 75. Shaft 73 may be considered to be an input drive shaft for the controller apparatus for driving the apparatus transmission and cam shafts via pinion 75, as hereinafter explained in detail. Further, the preferred exemplary embodiment of irrigation control apparatus to be now explained in detail is the subject matter of my copending U.S. Pat. application Ser. No. 190,530 for United States Letters Patent entitled, "Automatic Controller Drive Mechanism," filed concurrently with the filing of this application, now U.S. Pat. No. 3,735,779.

Figure 1:
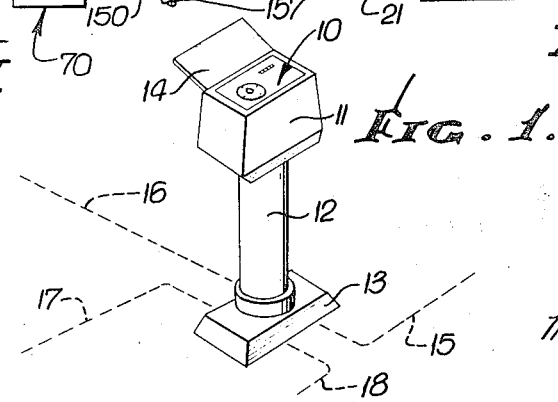
FIG. 1 is a perspective view of a preferred exemplary embodiment of an automatic irrigation control apparatus driven by water powered means, according to the present invention, mounted in a pedestal and associated with underground water control lines shown in dotted line.

Referring first to FIG. 1, the exemplary embodiment of control apparatus of the present invention, indicated generally at 10, is of a size and configuration which suits it for mounting in a housing 11 supported on a pedestal 12 having a base 13. A cover plate 14 may be provided on the housing 11 to protect the control apparatus, indicated generally at 10, from the outside weather conditions. It should be noted that the pedestal and housing mounting of FIG. 1 is merely exemplary of one manner of installing the control apparatus of the present invention in association with control or pilot lines, as underground lines 15 through 18, shown in dotted line, running to various irrigation or sprinkling sections of an overall watering system. As will be explained in more detail hereinafter, the control apparatus, indicated generally at 10, is adapted to operate pilot valves in a predetermined timed sequence for selectively pressuring the lines 15 through 18 to operate pilot operated flow valves located in known manner in each of the system sections.

Figure 2:
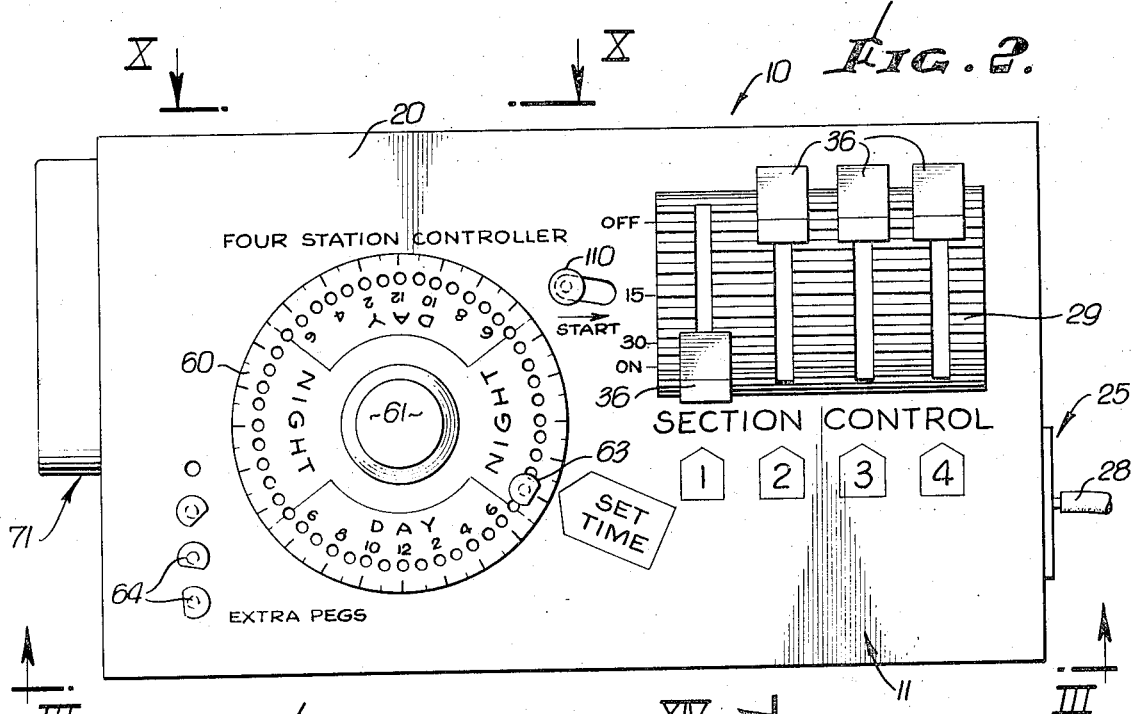
FIG. 2 is a plan view of the control panel of the exemplary embodiment of automatic irrigation control apparatus, according to the present invention.
Figure 3:
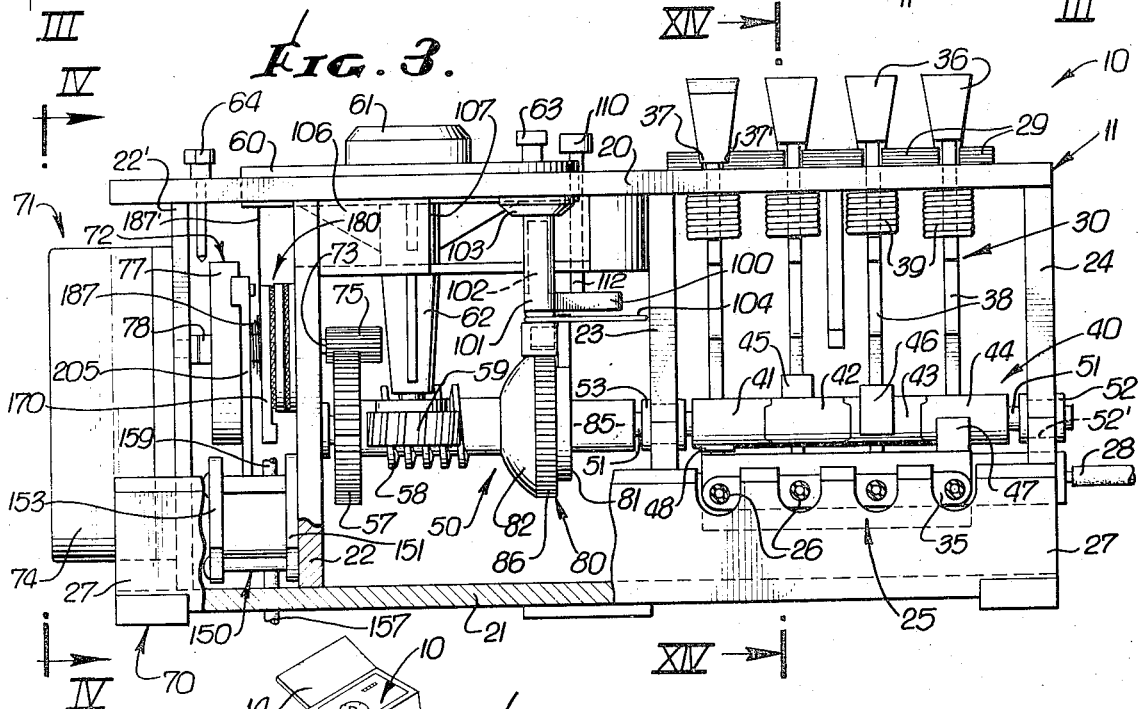
FIG. 3 is a side view, partially in section, of the preferred exemplary embodiment of water powered means in the automatic irrigation control apparatus of FIG. 2 taken therein along the plane III—III.

Referring now to FIGS. 2 and 3, the exemplary embodiment of control apparatus, indicated generally at 10, includes a face or mounting plate 20, a rear or back plate 21, and a plurality of interconnecting partition walls 22, 23, and 24. The major portions of the partition walls 22, 23, and 24 may be molded integrally with the face plate 20 and be assembled to mating corresponding portions thereof formed integrally of the back plate 21. Such assembly of front, back, and partition walls comprises a frame for mounting various operating portions of the control apparatus, the frame and operating portions being insertable into a housing such as housing 11 shown in FIG. 1.

As in my prior automatic irrigation control apparatus of United States Letters Patent No. 2,821,434, a bank of pilot valves, indicated generally at 25, is operated by a corresponding number of control levers, indicated generally at 30, the latter being operated by caming means, indicated generally at 40, driven by a clutch and transmission means, indicated generally at 50, associated with an electric, clock-type, motor 70.

Referring to FIGS. 3 and 14 through 16, particularly, the bank of pilot valves, indicated generally at 25, may be constructed as explained in my U.S. Pat. No. 2,821,434 and mounted between the partition walls 23 and 24 of the present exemplary embodiment of apparatus with the outlet lines, as line 26, extending outwardly through scalloped portions of the frame sidewall portion 27. Portion 27 is preferably formed integrally of the back wall 21 via a molding operation. Further, most of the components of the present apparatus are preferably made of plastic molded parts to provide a less expensive apparatus than would otherwise be attainable with machined metallic parts. A water inlet line 28 is connected to an inlet portion of the bank of pilot valves and, upon selective operation of the pilot valves due to positioning of the operating levers, as more fully explained hereinafter, each one of the outlet lines 26 may be interconnected to the inlet line 28 through the associated pilot valve to operate each of the associated pilot operated flow valves in the various sections of the irrigation system.

Figure 9:
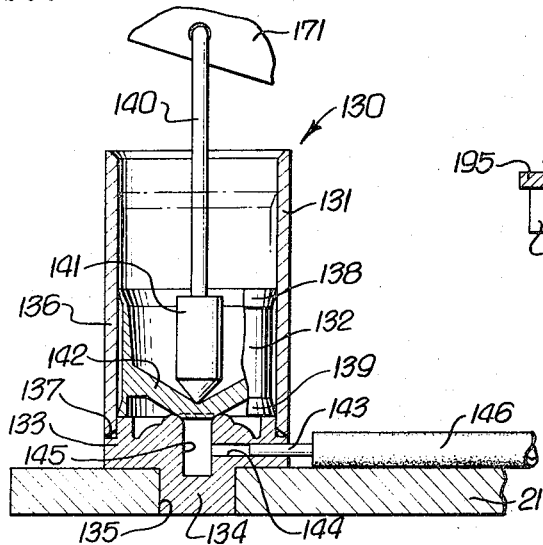
FIG. 9 is a detail view, partially in section, of the preferred exemplary embodiment of piston and cylinder means of the water powered means of FIGS. 4 and 6.
Figure 8:
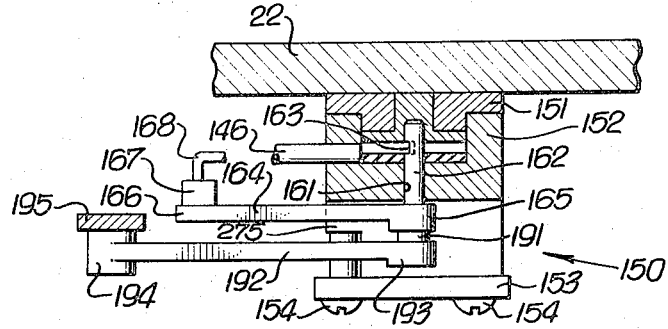
FIG. 8 is a detail view, partially in section, of the valve apparatus of FIG. 7 taken therein along the plane VIII—VIII.
Figure 10:
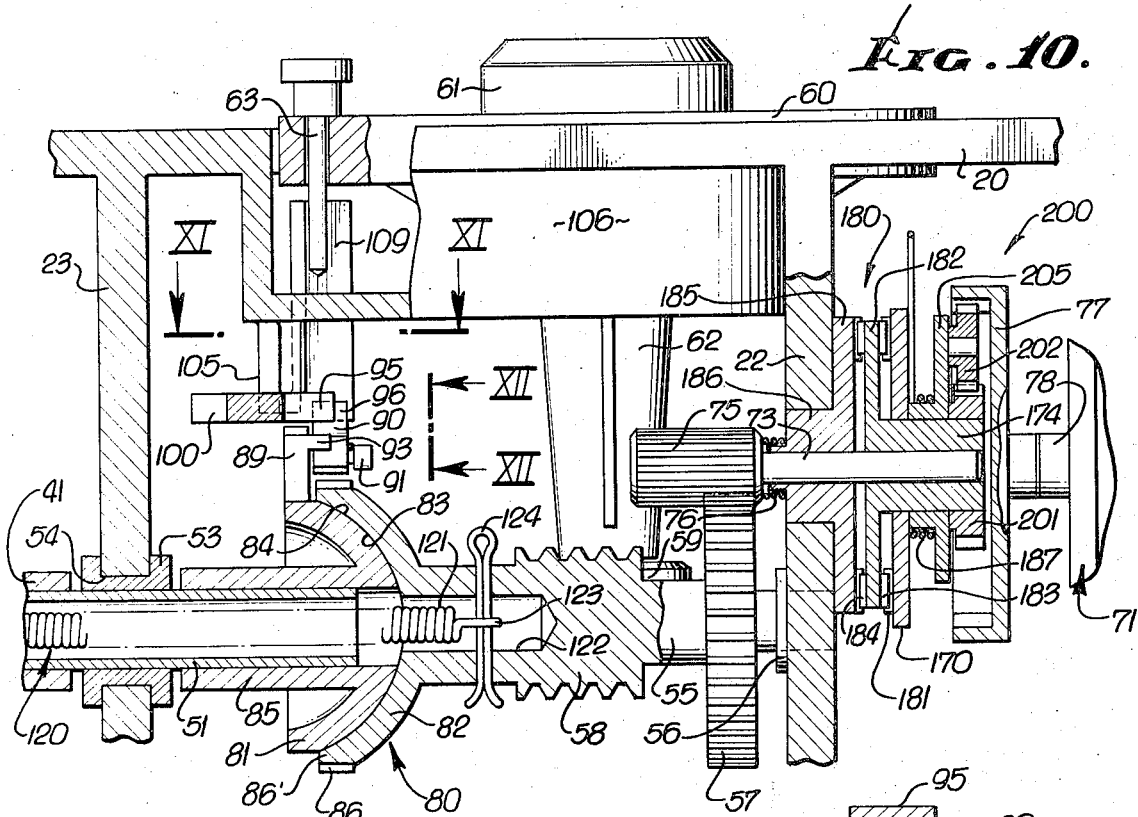
FIG. 10 is a detail view, partially in section, of the exemplary embodiment of control apparatus of FIG. 2 taken therein along the plane X—X.

A series of control levers for operating the individual pilot valves of the apparatus are provided as in my prior U.S. Pat. No. 2,821,434 and as explained generally herein with reference to FIGS. 3 and 14 through 16. The control levers, indicated generally at 30, each includes an operating tip 31 which fits in a slot 32 (FIG. 15) provided in the head 33 mounted to the valve pin 34 of the associated pilot valve 35. The knob end 36 of each operating lever is provided with a fulcrum 37 which is selectively locatable between the teeth of the slotted ratchet means 29 formed integrally of the front face plate 20. A fulcrum or index finger point 37, 37' may be formed integrally of each of the knob ends 36 on either side of the layer body or shank 38 to engage between the continuous ratchet teeth extending across the face plate between the slots as seen in FIG. 2. Spring means, such as the coil spring 39, are provided on each control lever body, as seen in FIGS. 8 through 10, for biasing the lever knob associated fulcrums for index fingers 37 into the selected grooves in the ratchet means.

As can be seen by comparison of the showings of FIGS. 14 through 16, each control lever may be adjusted into different timing positions by moving its associated knob across the ratchet means 29 under the bias of the associated spring means 39. Through such positioning of each control lever, the length of engagement between the caming means and a cam follower formed in the lever is varied.

Caming means are provided in the exemplary embodiment, as indicated generally at 40, in FIGS. 3 and 17. Such means, in the exemplary embodiment, may include the provision of individual plastic molded cam shaft units 41 through 44 assembled in fixed relationship to one another and having integrally mlded cams 45 through 48. The individual units 41 through 44 may be molded with interlocking connections as seen in FIG. 3. As seen in FIGS. 14 through 16, the rotation of the cam means brings the individual cams 45 through 48 into engagement with a cam follower portion, as portion 49, on each of the control levers which are adjusted into a position other than the extreme "off" position of FIG. 14. When the control lever is moved into an operating position, as shown in FIG. 15, the cam 45 engages follower portion 49 to pivot the tip in 31 of the control lever about its fulcrum or index finger portions 37 to open the associated pilot valve and interconnect the water supply inlet line 28 through the associated outlet line 26 to a selected pilot operated flow valve in the irrigation system via one of the pilot lines 15 through 18.

The caming means for operating the pilot valves, as hereinbefore explained, is mounted to and driven by a clutch, transmission, and drive shaft assembly including means therein which provide for a rapid advancement of the caming means between engagements with the various operating levers independently of the single motor drive.

Referring now to FIGS. 10 and 18, the caming means, including the individual caming units 41 through 44, are fixed upon a tubular axle or driven shaft 51. The outer end of shaft 51 is journaled in a bearing 52 provided in an opening 52' formed in the outer partition wall 24 along one of the parting lines thereof between the upper portion of the partition molded integrally with the front plate and the lower portion of the partition molded integrally of the back plate, As seen in FIG. 10, an inner portion, spaced from the inner end of shaft 51, is journaled within the journal bearing 53 provided in an opening 54 formed in the partition wall 23 along a parting line between the upper and lower portions thereof. The journal bearings 52 and 53 may be assembled into their respective openings formed in the partition walls upon assembly of the front wall and its associated upper partition portions to the integrally molded back wall and lower partition portions. As will be explained in detail hereinafter, driven shaft 51 is driven by the transmission means, indicated generally at 50, and forms a part of the means for rapidly advancing the caming means between engagements with the respective control levers, indicated generally at 30, in accordance with the present invention.

The clutch and transmission means, indicated generally at 50, is driven by the water powered motor drive means of the present invention, indicated generally at 70, in the present exemplary embodiment of control apparatus. The transmission means includes a drive shaft 55 having one end journaled in journal bearing 56, fixed within an appropriate opening provided in partition wall 22, which mounts a spur gear 57 which meshes with and is driven by the motor driven pinion 75.

Means are provided for advancing the transmission drive shaft 55 and indicating the timed advancement thereof. In the exemplary embodiment, such means include the provision of a worm gear 58, which may be formed integrally of the drive shaft 55, which mates with a worm 59 mounted to the timing disk 60. As seen in FIGS. 2, 3, and 10, timing disk 60 is provided with a knob 61 for rotating disk 60 and a cantilevered arm or stud 62 having the worm 59 mounted on an end thereof for mating engagement with the worm gear 58. Rotation of drive shaft 55 under the influence of the water powered drive means 70 produces a timed rotation of a timing disk 60. As seen in FIG. 1, the upper surface of timing disk 60 is provided with a ring of perforations to receive timing pins in selected locations corresponding to the hours of 2 days and 2 nights for a 48-hour cycle. As will be explained hereinafter, the location of timing pegs on the timing disk, as peg 63, causes a predetermined timed operation of a pilot valve operating cycle. Extra pegs, as pegs 64, may be mounted to appropriate pin holes provided in the face plate as seen in FIG. 2.

In accordance with the present exemplary embodiment, the transmission means is provided with clutch means and means for rapidly advancing the caming means relative to the transmission drive shaft 55 driven by the motor 70. Considering the clutch means first, and referring particularly to FIGS. 3 and 10 through 13, the clutch means, according to the present invention, includes the provision of a clutch body, indicated generally at 80, and including an inner driven member 81 and an outer driving member 82. The outer driving member 82 is of bell shape having an inner concave bearing surface 83 and, as in the preferred exemplary embodiment herein, is formed integrally of the transmission drive shaft 55. The inner driven member 81 is also of a bell shape having an outer convex bearing surface 84 sized to mate within the concave bearing surface 83 of member 82. Bell-shaped inner driven portion 81 is preferably a molded plastic part having an integral hollow tubular body or journal portion 85 which receives the inner end of cam means mounting and driven shaft 51 in a press fit relation. The bearing faces or surfaces 83 and 84 of the outer and inner bell-shaped members 82 and 81, respectively, are preferably lubricated, as through the provision of grease therebetween, to facilitate relative rotation therebetween during rapid advancing of the caming means between control lever engagements as hereinafter explained.

Figure 12:
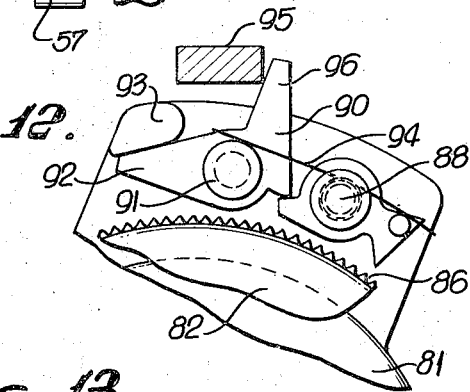
FIG. 12 is a detail view of a portion of the clutch mechanism of the apparatus of FIG. 10 taken therein along the plane XII—XII, showing the clutch holding pawl in unlocked condition.
Figure 13:
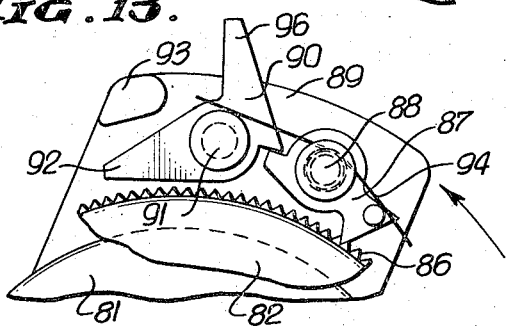
FIG. 13 is a detail view as in FIG. 12 but showing the clutch holding pawl in a locked position.

The clutch means is further provided with a locking pawl and ratchet wheel assembly for interconnecting the outer drive member 82 to the inner driven member 81 to cause rotation of the driven shaft 51 and associated cam shaft (units 41 through 44) by the drive motor 70 in response to actuation by the timing pin 63. A ratchet wheel 86 is preferably formed integrally about a peripheral rim 86' of the bell-shaped drive member 82 which is adapted to be engaged by a locking pawl 87 pivotally mounted by pin 88 on a radially extending flange 89 formed integrally of the inner bell-shaped driven member 81. The locking or holding pawl 87 is operated by an associated operating pawl 90 which is also pivotally mounted on flange 89 by a pivot pin 91. Arcuate movement of operating pawl 90 is restricted due to the provision of a stop arm 92 adapted to engage stop 93, provided on flange 89, as best seen in FIG. 12. The holding pawl 87 is normally biased into a holding or ratchet engaging or locking position as seen in FIG. 13 due to the bias of the spring means 94. However, prior to the initiation of a pilot valve operating cycle, a holding lever 95 is normally positioned in engagement with the arm 96 of operating pawl 90 (see FIG. 12) to hold the locking or holding pawl in an unlocked position. With the pawl assembly in the position of FIG. 12, the rotation of transmission drive shaft 55 due to the continuous operation of timing motor 70 produces a timed rotation of the timing disk 60 but does not cause a rotation of the caming means via driven shaft 51 and clutch inner driven member 81 until the holding pawl 87 is released through displacement of holding lever 95 away from arm 96 of the operating pawl 90.

Figure 11:
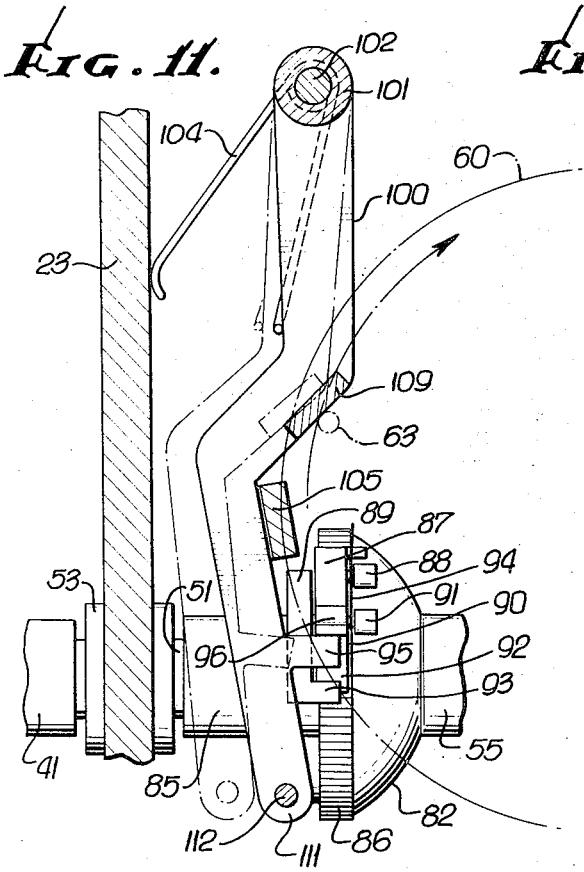
FIG. 11 is a detail view, partially in section, of a portion of the apparatus of FIG. 10 taken therein along the plane XI—XI.

The pawl assembly operating control arm 100, as best seen in FIGS. 3 and 11, is mounted at one end 101 on a stud 102 secured in the boss 103 formed integrally of the underside of face plate 20. Arm 100, as best seen in FIG. 11, is normally biased by spring means 104 about the stud 102 into engagement with a stop 105 formed integrally of a housing 106 molded to the underside of face plate 20. The housing 106 is open in a quadrant thereof, defined by end walls 107 and 108, as seen in FIG. 3 to allow engagement between the depending timing pins, as pin 63 moving about within the housing, with a ramp 109 formed integrally of lever 100. As a timing pin 63 is moved by the timing disk 60 into engagement with the ramp portion 109 of lever 100, the lever 100 is pivoted about its pivot pin 102 against the bias of spring 104 to move the lever portion 95 out of engagement with the operating pawl 90, said lever 100 moving from the position shown in solid line in FIG. 11 to the released position shown in dotted line in FIG. 11. Such movement of the control arm or lever 100 may also be effected by manually moving the start button 110 (FIG. 2) protruding out of the face plate 20 and which is connected to the free end 111 of the control arm by a vertical pin 112.

It can be seen by the foregoing, that the cam means, indicated generally at 40, may be placed in a timed rotational movement under the timing motor drive of motor 70 via the transmission shaft 55 when the start button 110, or a timing peg 63, moves control arm 100 to disengage the control arm lever 95 from arm 96 of operating pawl 90. On release of pawl 90, the holding or locking pawl 87 moves under its normal spring bias into the holding position of FIG. 13 wherein the inner driven bell-shaped clutch member 81 is engaged in driving relation with the outer bell-shaped clutch member 82. With the construction of the apparatus as thus far explained, a single speed of operation only for the caming means would be provided. Means are provided for rapidly advancing the caming means, indicated generally at 40, between engagements between the cams 45 through 48 with the various operating levers, indicated generally at 30, independently of the single timing drive motor 70 to provide for a rapid indexing of the cam means between control stations so that nonwatering time for the control cycle is greatly reduced and a sequential timed watering operation for each area of the irrigation system can be produced in a virtually continuous watering operation. A preferred exemplary embodiment of such means for rapidly advancing the caming means relative to the operating levers independently of the single speed drive motor 70 and associated transmission drive shaft 55 will now be explained in detail.

Referring particularly to FIGS. 10 and 18, the exemplary embodiment of means for rapidly advancing the caming means between engagements with the pilot valve operating levers, indicated generally at 30, includes the provision of a means for receiving and storing energy during rotation of the transmission drive shaft 55 relative to the driven shaft 51, as when the holding pawl is in a released position as shown in FIG. 12, and for releasing said energy to rapidly advance the caming means between engagements with the operating levers when it is not necessary to overcome the resistance offered by the engagement between a caming means cam and an associated control lever, a certain amount of driving power being required to turn a cam passed a cam follower portion 49 of the control lever to move the associated pilot valve into an open position. Such means in the exemplary embodiment specifically includes the provision of a torsion spring means, indicated generally at 120 in FIGS. 10 and 18, within the driven shaft 51 and fixed to the transmission drive shaft 55. As seen in FIG. 10, one end 121 of the spring means 120 is located within an inner bore 122 of the transmission drive shaft 55 with an end eye portion 123 nonrotatably secured to shaft 55 via the cotter pin 124. Therefore, the one end 121 of the torsion spring means 120 is rotated by and with the transmission drive shaft 55 under the constant timing drive of motor 70 via the pinion and spur gears 75 and 57, respectively. As seen in FIG. 18, the portion 125 of the spring means 120, adjacent the end opposite the one end 121 in the exemplary embodiment, is provided with an enlarged outside diameter, relative to the main body of spring means 120, which is greater than the inside diameter of the driven tubular shaft 51 when the spring means 120 is in a relaxed, unwound condition. The portion 125 must, therefore, be press fitted into the bore 126 of driven shaft 51 or wound to reduce its diameter during assembly thereinto. An end cap 127 is provided to close the end through which the spring means 120 is normally inserted and which, in the exemplary embodiment, is journaled in a bearing 52 of the outside partition wall 24. In actual practice, it has been found that it is desirable to make the hollow cam or driven shaft 51 of a one-fourth inch O.D. 0.035 wall seamless brass tube, alloy 330 or 218 with an inside diameter of 0.180 plus 0.005 and a minus 0.000. Further, it has been found desirable to knurl the outside diameter of the cam shaft or driven shaft 51 to facilitate retention of the molded plastic cam units 41 through 44 which may be merely pressed thereon. In a preferred embodiment using the aforesaid brass tube for cam shaft 51, the torsion spring means 120 consisted of a 0.018 diameter spring steel wire, close wound, spring with a 0 – 3 ounce initial tension and a right hand pitch. The main body portion of the spring had an outside diameter of between 0.170 and 0.180. The larger diameter portion 125 was provided with an outside diameter of between 0.188 and 0.192. (The aforesaid dimensions being in inches).

Prior to a pilot valve operating cycle initiation, the transmission shaft 55 rotates relative to the stationary cam or driven shaft 51 as hereinbefore explained. With the spring means of the aforedescribed construction, the one end 121 will be rotated relative to the stationary enlarged diameter end 125 held within the stationary cam shaft 51. However, the continued twisting of the spring means causes a slight elongation thereof and a reduction in the outside diameter of the enlarged portion 125 until slippage between portion 125 and the sourrounding stationary cam shaft 51 occurs. Therefore, energy is stored by spring means 120 during prepilot valve operating cycles due to the rotation of the transmission shaft 55 relative to the stationary cam shaft 51 which is ready to be used for rapid advancing of the cam means thereafter. Upon initiation of a pilot valve operating cycle, the clutch means, including the aforedescribed pawl assembly, causes concurrent rotation of the transmission shaft 55 and cam shaft 51 passed the resistance offered by the individual control levers of the control levers indicated generally at 30. When a control lever, as lever 38 is positioned as shown in FIG. 15, the associated cam must force the lever 38 in a pivotal movement about its fulcrum 37 against the resistance due to the conventionally provided self-closing valve spring within the pilot valve 35. The spring means 120 is chosen and the dimensions for the interference fit between the enlarged diameter 125 and the bore 126 of cam shaft 51 are chosen so that the spring means 120 cannot store sufficient energy to overcome the resistance offered by the control lever. It is, therefore, necessary to positively drive shaft 51 via the clutch and transmission means to complete a timing operation during which a pilot valve is held in open position.

However, when the cam, as cam 45 in FIG. 16, is in a non-interfering relation with the cam follower, as cam follower 49 in FIG. 16, of the associated control lever, then the spring means 120, in its effort to return to an untwisted condition, twists the cam shaft 51 via its enlarged diameter portion 125 to cause a rapid advance thereof until an engagement occurs between another cam on the cam means, indicated generally at 40, and an associated control lever cam follower, as 49 in FIGS. 14 through 16.

THE EXEMPLARY WATER POWERED DRIVE

Referring now particularly to FIGS. 3 and 4 through 10, a preferred exemplary embodiment of the water powered drive means, in accordance with the present invention, for operating an automatic control apparatus will now be explained in detail. The drive means is indicated generally at 70 with a speed control 71 operably connected to the water powered motor means of the present invention, indicated generally at 72. Speed control means 71 may comprise a conventional escapement mechanism within a housing 74 which is mounted to a partition wall 22' of the controller frame. An internal ring gear 77 is connected via drive shaft 78 to the escapement mechanism in known manner to provide a clock-type, timing rotation for ring gear 77 under outside driving influence very much as the escapement mechanism in a watch operates to produced a timed movement of the main shaft thereof under the influence of the associated main spring. As hereinafter explained, the water powered drive means, indicated generally at 72, according to the present invention, is provided with means for connecting to the ring gear 77 so that the water motor means can be controlled to drive input shaft 73 at a constant, timing speed for the controller apparatus.

As is particularly contemplated within the present invention, water powered means are provided for receiving water under pressure from a source thereof and such means includes a member driven in a predetermined manner by the force of such water to power the controller transmission means via a power transmission means interposed therebetween. In the preferred exemplary embodiment, such water powered means includes a water powered motor, indicated generally at 130 in FIGS. 4, 6, and 9, having a cylinder means 131 and piston means 132. Cylinder means 131 includes a base 133 having a depending stud 134 secured in a port 135 formed in base 21 and a cylindrical body portion 136 seated in a peripheral groove 137 formed in base 133, as best seen in FIG. 9. Piston 132 is provided with upper and lower cylinder wall engaging lips 138 and 139, respectively, to provide a watertight seal between the piston and cylinder body 136. A connecting rod 140 having a pointed rod end body 141 is associated, as seen in FIG. 9, with the piston base 142 which is formed concave to cause the pointed rod end body 41 to be centered relative thereto. As explained hereinafter, the connecting rod 140 is free to move upwardly and downwardly free of piston 142, but under a power stroke of piston 142 during operation of the motor means, the connecting end body rod 141 will be centered in base 142 to provide a non-binding force transmitting means between piston 132 and the reciprocating ratchet arm to which the connecting rod is connected at its upper end. An inlet or fitting 143 is connected through port 144 in base 133 to an inlet chamber 145 beneath the piston 132 to receive water under pressure from cylinder supply line 146 and force the piston 132 upwardly in cylinder 131 in a drive stroke from a first position as illustrated in FIG. 9 in solid line to a second elevated position shown in dotted line in FIG. 9.

Figure 4:
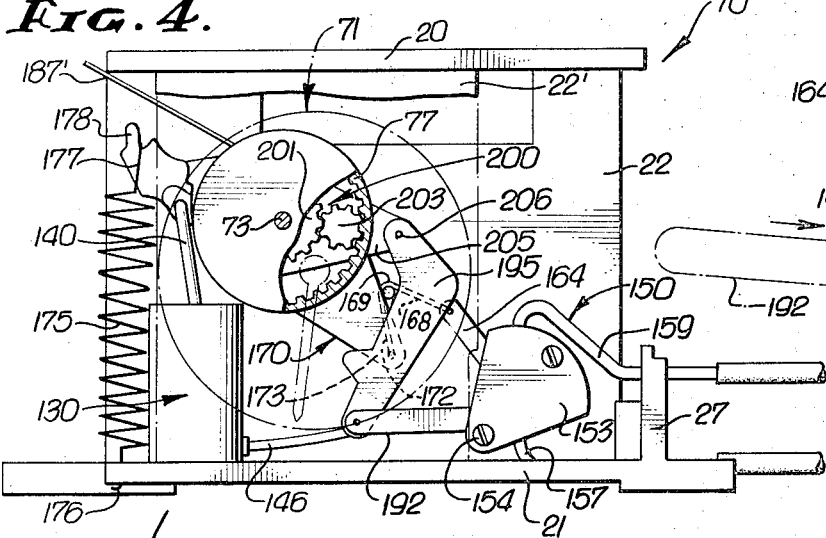
FIG. 4 is a detail view, partially in section, of the preferred exemplary embodiment of water powered means for driving the exemplary control apparatus of FIG. 3 taken therein along the plane IV—IV showing the associated valve means reversing and restricting control arms in cylinder venting and inlet line restricting positions, respectively.
Figure 5:
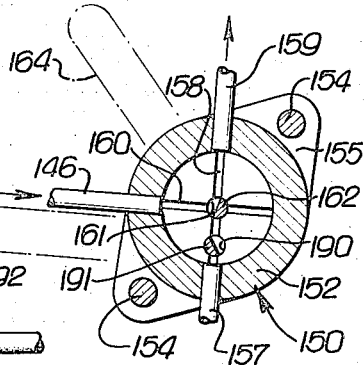
FIG. 5 is a sectional view of the valve means of FIG. 4 showing the venting and restricting positions for the valve shafts associated with said reversing and flow control arms.

Water valve means are provided in accordance with the present invention for selectively connecting the aforedescribed water powered means, including cylinder 131 and piston 132, to a source of water under pressure for supplying water thereto and for selectively venting the water powered means to relieve such water pressure therefrom. In the exemplary embodiment, such water valve means are indicated generally at 150 in FIGS. 3, 4, and 6 and shown in sectional views in FIGS. 5, 7, and 8. Referring first to FIG. 8, the exemplary water valve includes a valve base 151, a valve body, 152, and a cover plate 153. The cover plate, body, and base members are held in assembled relation via fastening means, such as screws 154, extending from the cover plate 153, through body 152 and flanges 155 on base 151 into the controller apparatus frame partition wall 22. Valve body 152 is provided with an inlet line 156 connected by conduit 157 to a source of water under pressure, an outlet line 158 connected to vent or drain conduit 159, and a supply line 160 connected to the cylinder connected line 146. The three valve lines 156, 158, and 160 intersect in a common intersection, which in the exemplary embodiment, comprises a cylindrical bore 161 provided in the valve body 152. Valve shaft means having a flow regulating portion thereof are located at the intersection 161. As best seen in FIG. 8, a valve shaft 162 having a cutoff portion or flow regulating portion 163 is rotatably mounted within the bore 161 providing the common intersection for lines 156, 158, and 160. As seen by comparing FIGS. 5 and 7, rotation of valve shaft 162 selectively interconnects the cylinder means supply line 160 with the inlet line 156 (FIG. 7) or the vent or drain line 158 (FIG. 5).

Figure 6:
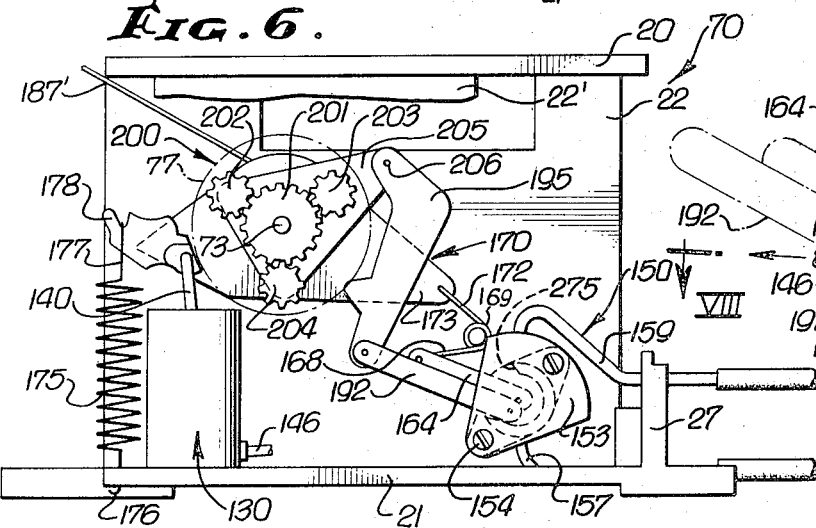
FIG. 6 is a view of the apparatus of FIG. 4 showing the valve means associated reversing and flow control arms in cylinder supply and non-restricting flow positions, respectively.

Means are provided for reversing the position of the valve shaft 162 relative to the inlet and outlet lines in response to reciprocating movement of the piston 132 of the exemplary water motor indicated at 130. In the exemplary embodiment, such means include the provision of a valve control arm 164 connected via a bored boss 165 at one end to the valve shaft 162 for rotation of shaft 162 in response to arcuate movement of the free end 166 of arm 164 about the pivotal axis of shaft 162. The free end 166 of arm 164 is connected via a bored boss portion 167 to an end 168 of spring means 169, as seen in FIGS. 4, 6, and 8, for reversing movement in response to reciprocating arcuate movement of lever 170 connected by lever arm 171 to the piston connecting rod 140. The spring means 169 has an opposite arm or end 172 connected to lever arm portion 173 of the lever 170. As best seen in FIG. 10, lever 170 is journaled upon a journal bearing 174 fixed to shaft 73 such that lever 170 may be reciprocally rotated through a limited arc by the operation of piston 132 thereon through connecting rod 140 to cause movement of lever arm 173 between the two extreme positions of adjustment shown in FIGS. 4 and 6. In the position for arm 173 of FIG. 6, the spring means 169 biases valve arm 164 in a full counter-clockwise direction against a stop surface 275 formed in body 152, the associated valve shaft 162 thereby being rotated into a cylinder line 160 supply line 156 connected position shown in FIG. 7. At the end of a power stroke for piston 132, as seen in dotted line in FIG. 9, the lever 170 is moved into the position illustrated in FIG. 4, torquing arm 172 relative to arm 168 to cause reversing clockwise movement of arm 164 fully into the raised position of FIG. 4 wherein the associated valve shaft 162 is rotated into the cylinder line 160-vent or drain line 158 connecting position of FIG. 5.

Mechanical means are provided, according to the present invention, for returning the piston means of the water powered motor means of the present invention to its initial starting position at the end of a drive means upon reversing of the valve means as aforedescribed. In the exemplary embodiment, such return means comprise the provision of the tension spring 175 connected at its lower end 176 to the controller frame base 21 and at its upper end 177 to a hook or finger portion 178 formed in the outer end of lever arm 171. Upon movement of the lever 170 into the position of FIG. 4 under the action of piston 132, and the consequent reversing of valve means 150 into the venting condition illustrated in FIG. 5, the tension applied by spring 175 to arm 171 causes the lever 170 to be returned to its initial position of FIG. 6 as the water beneath piston 132 is drained via line 158 and conduit 159. When piston 132 reaches its initial or first position of FIG. 9, the lever 170 has moved back to the position of FIG. 6 and the reversing mechanism has thrown arm 164 overcenter, due to the spring arrangement illustrated, into the full open or supply line connected position for the valve shaft 162 illustrated in FIG. 7. Due to the use of the overcenter reversing mechanism provided by the spring means 169 connection between arms 173 and 164, the rather slow movement of lever arm 173 is translated into a fast acting reversing motion for arm 164 to rapidly reverse the valve means as hereinbefore described.

Power transmission means are provided, in accordance with the present invention, for driving the controller apparatus power input shaft 73 (and pinion 75) in response to movement of the water powered means moving member, which in the exemplary embodiment comprises the piston 132. Such power transmission means, in the exemplary embodiment, are indicated generally at 180 and are best seen in FIGS. 3 and 10. Such means include the provision of a right hand or clockwise driving ratchet wheel 181 on the inward facing surface of lever 170. Such ratchet wheel 181 is preferably formed integrally of lever arms 171 and 173 to provide a single plastic molded ratchet-lever arm member rotatably journaled about the journal bearing 174 as aforedescribed. A second ratchet wheel 182 is provided with left hand ratchet wheel teeth 183 engaged on one side by said ratchet wheel 181 teeth and having right hand teeth 184 on the opposite side. Ratchet wheel 182 is preferably formed integrally of bearing 174 of a single plastic molded part and secured in non-rotating relation to shaft 173. From the foregoing, it can be seen that clockwise rotation of the ratchet-lever member 170 in FIGS. 4 and 6 will produce a corresponding clockwise rotational movement of ratchet 182 in an arcuate movement to advance controller apparatus input shaft 73 through a similar arc of rotation. In order to prevent counter-clockwise rotation of ratchet wheel 182 upon counter-clockwise reciprocation of ratchet-lever arm 170, a stationary ratchet wheel 185 is provided with an integral journal portion 186 secured to the apparatus frame partition wall 22. Wheel 185 is provided with a plurality of left hand ratchet teeth on its outward facing surface to mate with the teeth 184 of the planetary ratchet. The ratchet 182 thus is driven in a clockwise direction by the drive of ratchet-lever arm 170, while teeth 184 merely slide over ratchet 185 and, on reversing the movement of lever 170, the ratchet wheel teeth 184 engage the stationary ratchet 185 while the teeth of ratchet wheel 181 of lever 170 ride over the ratchet teeth 183. Means are provided for biasing the ratchet teeth into engagement with one another and, in the exemplary embodiment, include the provision of a coil spring 187 bearing against ratchet arm 170, as seen in FIGS. 3 and 10, and spring 76.

Figure 7:
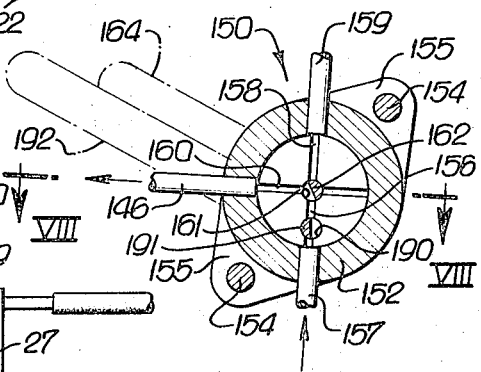
FIG. 7 is a sectional view of the valving apparatus of FIG. 6 showing the positioning of the associated reversing and restricting valve members.

In accordance with the present invention, means are provided for regulating the supply of water to the aforedescribed water powered means in order to control the speed of operation of the associated water motor, i.e., the speed at which piston 132, in the exemplary embodiment, moves upwardly in a power stroke. Referring to FIGS. 4 through 7, such means in the exemplary embodiment includes the provision of a second bore 190 in valve body 152 which intersects the inlet line 156 as seen in FIGS. 5 and 7. Bore 190 is preferably parallel to the bore 161. A second valve shaft 191, constructed with a cut-out or flow regulating portion adjacent an inner end thereof as in shaft 162, is provided to be rotated within bore 190 between the flow restricting position of FIG. 5 and the non-restricting position of FIG. 7. As seen in FIG. 8, a second valve arm 192 is connected by a bored boss 193 at one end to an enlarged outer end portion of shaft 191 with an opposite bored boss end 194 connected to regulating lever 195. Spring means 187 acts through carrier 205 and link 195 for urging the associated valve arm 192 into the raised position of FIG. 6 wherein the associated valve shaft 191 is in a line non-restricting position as illustrated in FIG. 7. The aforedescribed means for regulating the flow of water under pressure through inlet line 156, in the exemplary embodiment and according to the present invention, is further regulated by speed control means as hereinafter explained.

The speed regulating means provided in accordance with the present invention in association with the aforedescribed water inlet regulating means, is indicated generally at 200 in FIGS. 3, 4, 6, and 10. Such means, in the exemplary embodiment includes the provision of a sun gear 201 secured to the drive shaft 73 via bushing 174 (FIG. 10). A plurality of planetary gears 202, 203, and 204 are mounted on a carrier 205 which in turn is rotatably mounted coaxially of sun gear 201 on shaft 73 via the bushing 174. The individual planetary gears 202, 203, and 204 are each rotatably mounted upon pins molded integrally of the carrier plate or disk 205. Ring gear 77 is fitted over and about the planetary gears in teeth-engaging, driving relation as best seen in FIGS. 4 and 10. As noted hereinbefore, the escapement mechanism 71 restricts the speed of rotation for ring gear 77 to a predetermined maximum rate of rotation. Such maximum rate is chosen such that the drive imparted to the controller apparatus via input shaft 73 and pinion gear 75 will produce a rotation of the apparatus caming means, etc., in a timed sequence so that timing dial 60 is rotated in clocklike manner.

From the foregoing description, it can be seen that rotation of input drive shaft 73 by the aforementioned water powered motor means will cause concurrent rotation of the sun gear 201 which is fixed onto bearing 174, which in turn is secured to shaft 73. Such rotation of sun gear 201 causes a corresponding, depending upon the gear ratio therebetween, rotation of ring gear 77 in like direction against the restraint of the associated speed governing or escapement mechanism 71. Such a drive of ring gear 77 is effected through the planetary gears 202, 203, and 204. In the event that the speed of rotation of sun gear 201 exceeds that corresponding to the normal maximum drive allowed for ring gear 77 by the associated escapement mechanism 71, a relative rotation will occur between ring gear 77 and sun gear 201 which will cause planetary movement of the planetary gears 202, 203, and 204 about sun gear 201. Such planetary movement of the planetary gears causes a corresponding rotational movement of the carrier disk or plate 205 which is connected by a pin 206 to speed control arm 195. Therefore, fluctuations in the speed of sun gear 201 relative to the predetermined speed of rotation for ring gear 77 causes movement of carrier 205, lever arm 195, control arm 192 and the associated valve shaft 191 to regulate the flow of water through inlet line 156 to the supply line 160 and supply conduit 146 to the cylinder means of the water motor. Carrier 205 may be biased into the position of FIG. 6 by connecting the inner end of coil spring 187 thereto and allowing the free end 187' thereof to abut a portion of the controller frame, front plate 20 in the exemplary embodiment.

From the foregoing detailed description of a preferred exemplary embodiment of the water powered drive means for a controller apparatus, according to the present invention, it can be seen that a controller apparatus can be powered in a timed driving manner without the need for electrical connections or electric motor means normally required in such apparatus. Where the controller apparatus is an irrigation or water sprinkling controller, as in the preferred exemplary embodiment herein, the water powered means may be driven by the same source of water under pressure as is available for operating the pilot valves and the sprinkling system. It should be apparent to those skilled in the art that the controller and drive means of the present invention is particularly suited for installation in remote locations where water is available for sprinkling but electrical power is not. Further, the elimination of electrical motor means eliminates the potential of electrical shorts, motor failure, or other hazards which accompany the use of electric power in association with water-handling equipment. It is, therefore, believed that the objects aforestated have been achieved by the water powered drive means and controller apparatus of the present invention. Further, the water powered drive means of the present invention has been illustrated herein in association with a preferred exemplary embodiment of irrigation controller apparatus. It should be remembered that other forms of controller devices may be driven by the water powered means of the present invention. Further, various modifications, adaptations, and variations may be made in the construction of such water powered means, the present disclosure being exemplary only, within the spirit and scope of the invention defined by the following claims.

I claim:

1. In an automatic irrigation control apparatus having a bank of pilot water valves connected to a source of water under pressure and operated by a series of cam followers to selectively supply water under pressure to associated pilot operated water valves in an irrigation system and drive means for advancing said caming means relative to said followers, the improvement in drive means comprising the provision of:

piston and cylinder means for receiving water under pressure in a cylinder portion thereof for forcing said piston to move in said cylinder in a drive stroke from a first to a second position;

means for selectively connecting said cylinder portion to said source of water for introducing water under pressure into said cylinder portion and to a vent to relieve said cylinder portion of said water;

mechanical means for returning said piston to said first position upon connection of said cylinder portion to said vent;

means connecting said piston to said caming means for converting reciprocal movement of said piston between its positions into a one-direction advancement of said caming means; and means for regulating the speed at which said drive means advances said caming means, said regulating means comprising:

a sun gear secured to a drive shaft of said drive means;

a plurality of planetary gears mounted about and in engagement with said sun gear on a carrier rotatably mounted coaxially to said shaft, rotation of said sun gear causing opposite rotation of said planetary gears;

a ring gear mounted about and in engagement with said planetary gears;

means for restricting rotation of said ring gear to a predetermined speed or rotation, rotation of said sun gear at a speed other than that corresponding to said predetermined speed for said ring gear causing said carrier to be rotated due to planetary movement of said planetary gears about said sun gear within said ring gear; and means for varying the rate of flow of water to said cylinder means in response to movement of said carrier.

2. The improvement of a water powered motor drive of claim 1 wherein said means for selectively connecting said cylinder portion to said source of water and to vent comprises:

a valve means having an inlet line connected to said source, an outlet line connected to said vent, and a supply line connected to said cylinder portion, said three lines intersecting in a common intersection in a circular bore within said valve means;

a valve shaft means having a cut-out portion thereof located in said bore, rotation of said shaft relative to said bore selectively connecting said cylinder connected supply line to said inlet or outlet lines; and reversing means for reversing the position of said valve shaft cut-out portion relative to said inlet and outlet lines in response to reciprocal movement of said piston means.

3. The improvement of water powered motor drive of claim 1 wherein said means for varying the rate of flow of water to and from said cylinder means comprises:

a second bore provided across said inlet line in said valve means;

a second valve shaft means having a cut-out portion located in said second bore for varying the flow rate of water thereby through rotation of said second shaft; and means for rotating said second valve shaft in response to rotation of said carrier to maintain the speed of advancement of caming means virtually constant.

4. In an automatic irrigation control apparatus having a bank of pilot water valves connected to a source of water under pressure and operated by a series of cam followers to selectively supply water under pressure to associated pilot operated water valves in an irrigation system and drive means for advancing said caming means relative to said followers, the improvement in drive means comprising the provision of:

piston and cylinder means for receiving water under pressure in a cylinder portion thereof for forcing said piston to move in said cylinder in a drive stroke from a first to a second position;

means for selectively connecting said cylinder portion to said source of water for introducing water under pressure into said cylinder portion and to a vent to relieve said cylinder portion of said water in response to reciprocal movement of said piston;

means connecting said piston to said caming means for converting reciprocal movement of said piston into advancement movement of said caming means, said connecting means including speed control means for limiting the speed of advancement movement for said caming means imparted thereto from said piston means via said connecting means;

flow control valve means for selectively controlling the volumetric flow rate of water to said cylinder portion to regulate the speed of said piston in said cylinder portion in a drive stroke; and means associated with said speed control means for operating said flow control valve means to vary the speed of said piston in said drive stroke when the latter is other than that required by said speed control means to maintain a generally constant rate of advancement for said caming means.

5. In an automatic irrigation control apparatus having a bank of pilot water valves connected to a source of water under pressure and operated by a series of cam followers to selectively supply water under pressure to associated pilot operated water valves in an irrigation system and drive means for advancing said caming means relative to said followers, the improvement in drive means comprising the provision of:

a water powered motor means for driving said caming means past said series of cam followers;

means for connecting said motor means to a source of water under pressure to operate the same;

flow control valve means associated with said connecting means for regulating the rate of flow of water to said motor means and thereby the speed of operation of said motor means;

speed control means, including an escapement mechanism, for limiting the speed of advancement of said caming means to a predetermined rate; and means for automatically operating said flow control valve means in response to changes in the operating speed of said water powered motor means above or below said predetermined rate for said caming means limited by said speed control means to thereby vary the rate of water flow to said motor means to maintain a virtually constant speed of operation for said motor means under changing water pressure conditions of its water source.

6. The improvement in automatic control apparatus of claim 5 wherein:
said water powered motor means includes piston and cylinder means for receiving water under pressure in a cylinder portion thereof for forcing said piston to move in said cylinder in a drive stroke from a first to a second position;
said means for connecting said motor means to a source of water under pressure includes means for introducing water under pressure into said cylinder portion and alternatively to a vent; and
means are provided for operating said means for selectively connecting said cylinder portion to said source of water and to said vent automatically in response to movement of said piston between said first and second positions.

7. The improvement in automatic control apparatus of claim 6 wherein:
mechanical means are provided for automatically returning said piston to said first position upon relief of water pressure in said cylinder portion through connection of said cylinder portion to said vent.

8. The improvement in automatic control apparatus of claim 5 wherein said means for operating said flow control valve means comprise the provision of:
a sun gear secured to a drive shaft of said drive means;
a plurality of planetary gears mounted about and in engagement with said sun gear on a carrier rotatably mounted coaxially to said shaft, rotation of said sun gear causing opposite rotation of said planetary gears;
a ring gear mounted about and in engagement with said planetary gears;
means for restricting rotation of said ring gear to a predetermined speed of rotation, rotation of said sun gear at a speed other than that corresponding to said predetermined speed for said ring gear causing said carrier to be rotated due to planetary movement of said planetary gears about said sun gear within said ring gear; and
means connecting said ring gear to said flow control valve means for operating the latter in response to movement of the former.

* * * * *